United States Patent [19]
Williams et al.

[11] Patent Number: 5,842,038
[45] Date of Patent: Nov. 24, 1998

[54] OPTIMIZED INPUT/OUTPUT MEMORY ACCESS REQUEST SYSTEM AND METHOD

[75] Inventors: David Paul Williams, Mounds View; Stephen Sutter, Maple Grove; Robert Norman Anderson, Columbia Heights, all of Minn.

[73] Assignee: Unisys Corporation, Blue Bell, Pa.

[21] Appl. No.: 728,332

[22] Filed: Oct. 10, 1996

[51] Int. Cl.$^6$ ................................................ G06F 12/06
[52] U.S. Cl. ........................ 395/825; 395/827; 395/840
[58] Field of Search ................................ 395/825, 827, 395/890

[56] References Cited

U.S. PATENT DOCUMENTS

| 4,415,971 | 11/1983 | Guillemet et al. | 395/309 |
|---|---|---|---|
| 5,317,726 | 5/1994 | Horst | 395/182.1 |

*Primary Examiner*—Parshotam S. Lall
*Assistant Examiner*—David M. Ovedoritz
*Attorney, Agent, or Firm*—Charles A. Johnson; Mark T. Starr; Merchant, Gould, Smith, Edell, Welter & Schmidt

[57] ABSTRACT

A system and method for transmitting commands from one or more input/output devices to a memory is provided. An identification tag is appended to each command to define the command as either a read or write command. The read commands are separated from the write commands based on the state of the identification tag, and the read and write commands are separately queued. The read commands are stored in a first command queue, and the write commands are stored in a second, separate, command queue. The read commands in the first command queue are successively transferred to the memory upon completion of the current memory read function, and the write commands in the second command queue are successively transferred to the memory upon completion of the current memory write function. The transfer of the read and write commands is independent.

20 Claims, 8 Drawing Sheets

OPTIMIZED INPUT/OUTPUT MEMORY ACCESS REQUEST SYSTEM AND METHOD

FIELD OF THE INVENTION

This invention relates generally to memory access for input/output (I/O) read and write requests, and more particularly to a system and method for separately providing I/O read and write requests to a memory device in order to minimize command completion delays.

BACKGROUND OF THE INVENTION

The input/output (I/O) subsystem of a computer system provides the mode of communication between the system and the outside environment. The I/O interface, which provides a method for transferring binary information between system storage and external I/O devices, are typically special communication links that are necessary to resolve differences that exist between the computer and the I/O devices. However, a central processor is an extremely fast device capable of performing operations at very high speed, and the data transfer rates of peripheral devices are much slower than the transfer rate of the system computer. It is therefore desirable to increase the data transfer rate across the I/O interface as much as possible, to increase the overall speed of the computer system.

Read and write requests from the I/O of the system are often sequentially transmitted to the memory through uplinking circuitry. The read and write requests, or commands, are typically in the form of data packets. These packets originate at peripheral devices which are all coupled to the input/output bus, and the read and write requests are therefore intermingled, thereby presenting the uplinking circuitry with a mixture of read and write commands in the stream of packets it receives.

Prior art systems have utilized a temporary memory buffer to hold these memory access commands, while the memory acts on one memory access command at a time. The temporary memory buffer therefore allows the I/O to continually make memory requests whether the memory is currently available or not. Such a system has drawbacks, however. One drawback is that the buffer is typically a first-in-first-out (FIFO) buffer, requiring the most recently issued commands to wait until all previously issued commands have been executed to completion. For example, a series of write commands could be issued, and a read command from another I/O device could follow. The write commands, which take additional time to write the appended data into the memory, must all be completed prior to execution of the read command. The net result is that read and write memory access is potentially impacted by the order in which read and write packets were received in the buffer.

It is therefore desirable to alleviate these I/O interface delay problems, and ultimately increase the speed of the computer system. The present invention utilizes parallel buffers to separate read and write requests, thereby providing a solution to these and other problems, and offers other advantages over the prior art.

OBJECTS

It is a primary object of this invention to provide a system and method for reducing memory access times for input/output data read and write requests.

It is another object of the invention to increase the overall rate at which input/output memory access requests are presented to the memory.

It is still another object to minimize the delays associated with having an imbalance between memory access command types.

It is yet another object to minimize the time in which execution of a read request would be stayed during processing of write requests, and to minimize the time in which execution of a write request would be stayed during processing of read requests.

Another object of the invention is to process read and write commands in a parallel manner to eliminate completion-order dependencies between the read and write commands.

Other more detailed objectives will become apparent from a consideration of the Drawings and the Detailed Description of the Preferred Embodiment.

SUMMARY OF THE INVENTION

The present invention relates to a system and method for separately providing input/output (I/O) read and write requests to a memory device in order to minimize command completion delays.

In accordance with one embodiment of the invention, an input/output (I/O) interface architecture for use in a data processing system having an I/O bus and a memory is provided. The interface architecture includes an I/O bridge to output commands received from the I/O bus. An uplink module is coupled to the I/O bridge to receive the commands. The uplink module includes a read buffer that has multiple data registers to store read request commands, which are ultimately outputted to the memory. The uplink module also includes a write buffer. The write buffer includes multiple data registers where write request commands are stored, which are also ultimately outputted to the memory. The uplink module also includes a command decoder, that accepts the commands from the I/O bridge, and decodes identification bits within the command. The identification bits are decoded to distinguish the read request commands from the write request commands. The read request commands can then be routed to the read buffer, and the write request commands can be routed to the write buffer. Execution of the read and write commands is therefore independent of each other, which reduces input/output memory access cycle times.

In accordance with another embodiment of the invention, a method for transmitting commands from one or more input/output devices to a memory is provided. An identification tag is appended to each command to define the command to be either a read command or a write command. The read commands are any of those where the input/output devices read data from the memory, and the write commands are any of those where the input/output devices write data to the memory. The read commands are then separated from the write commands based on the identification tag, and the read and write commands are separately queued. The read commands are stored in a first command queue, and the write commands are stored in a second, separate, command queue. The read commands in the first command queue are successively transferred to the memory upon completion of the current memory read function. The write commands in the second command queue are successively transferred to the memory upon completion of the current memory write function. The transfer of the read and write commands is independent.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
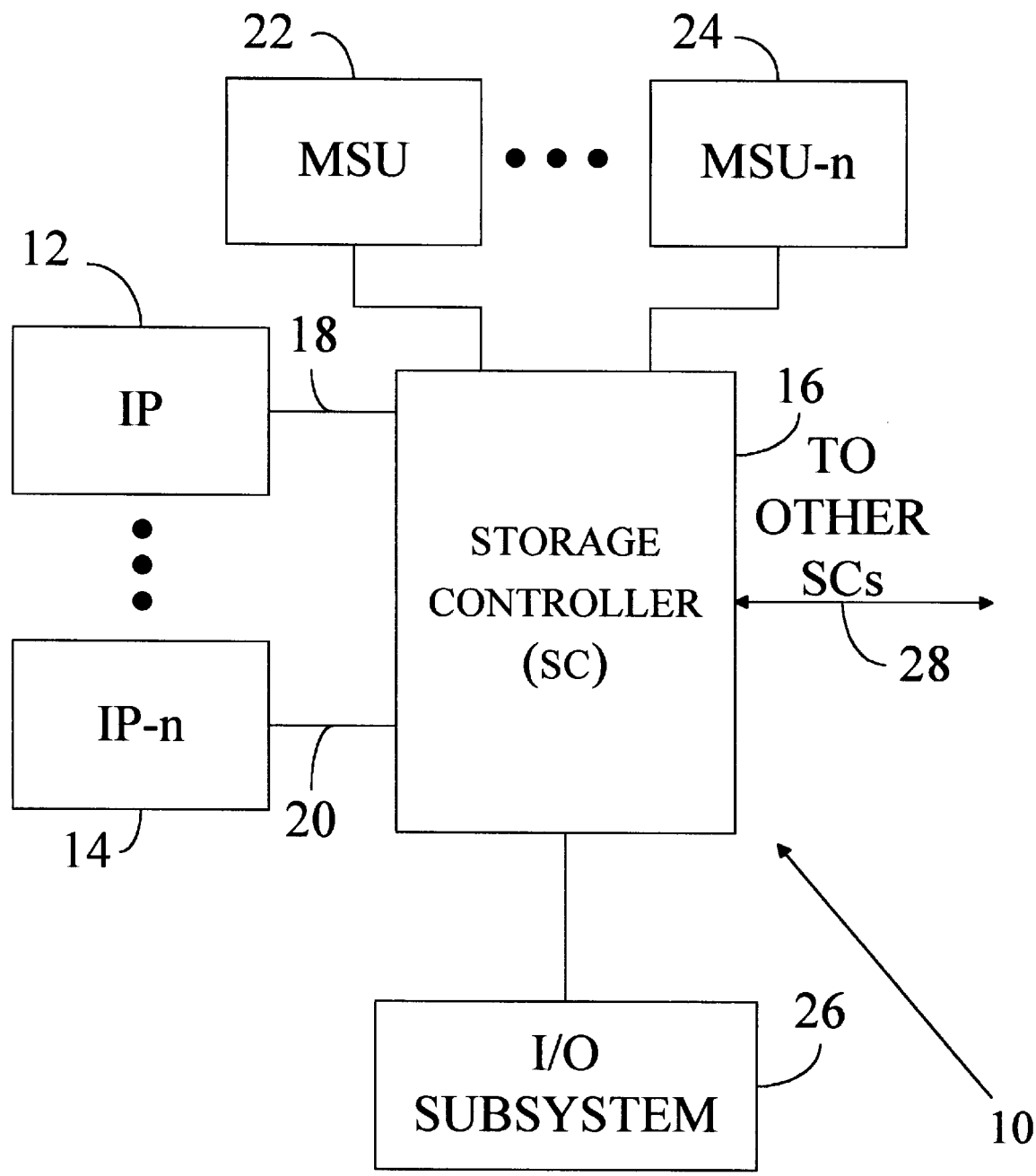
FIG. 1 is a block diagram of a multi-processor data processing system in which the present invention is embodied.

FIG. 1 is a block diagram of a multi-processor data processing system 10 in which the present invention is embodied. The system includes one or more instruction processors (IP), labeled IP 12 through IP-n 14. The instruction processors 12 through 14 provides the processing capabilities for the data processing system 10. IPs 12 through 14 are coupled to a storage controller (SC) 16 via lines 18 through 20 respectively, which represent the collection of control, data, and address lines between the IPs and the SC 16. The SC 16 is the central interconnect for the instruction processors, input/output, and main memory storage. There are no direct connections between any of these components, as the SC 16 contains all of the logic that ties the instruction processors and the input/output together in a tightly coupled system.

The main memory storage in the data processing system 10 includes the main storage unit (MSU) 22 through MSU-n 24. MSUs 22 through 24 represent the main memory in the data processing system 10. The SC 16 routes read and write requests from IPs 12 through 14 to and from MSUs 22 through 24.

Also coupled to the SC 16 is the I/O subsystem 26. The I/O subsystem 26 represents a collection of input/output devices and input/output bussing mechanisms. Memory requests can originate from components within the I/O subsystem 26, and the SC 16 provides the interface between the I/O subsystem 26 and the memory components within the data processing system 10. Other storage controllers can be coupled to the SC 16 to allow data processing system 10 to be coupled to other data processing systems, which increases the overall processing power and memory capabilities. Additional data processing systems are coupled between storage controllers, as indicated by line 28.

Figure 2:
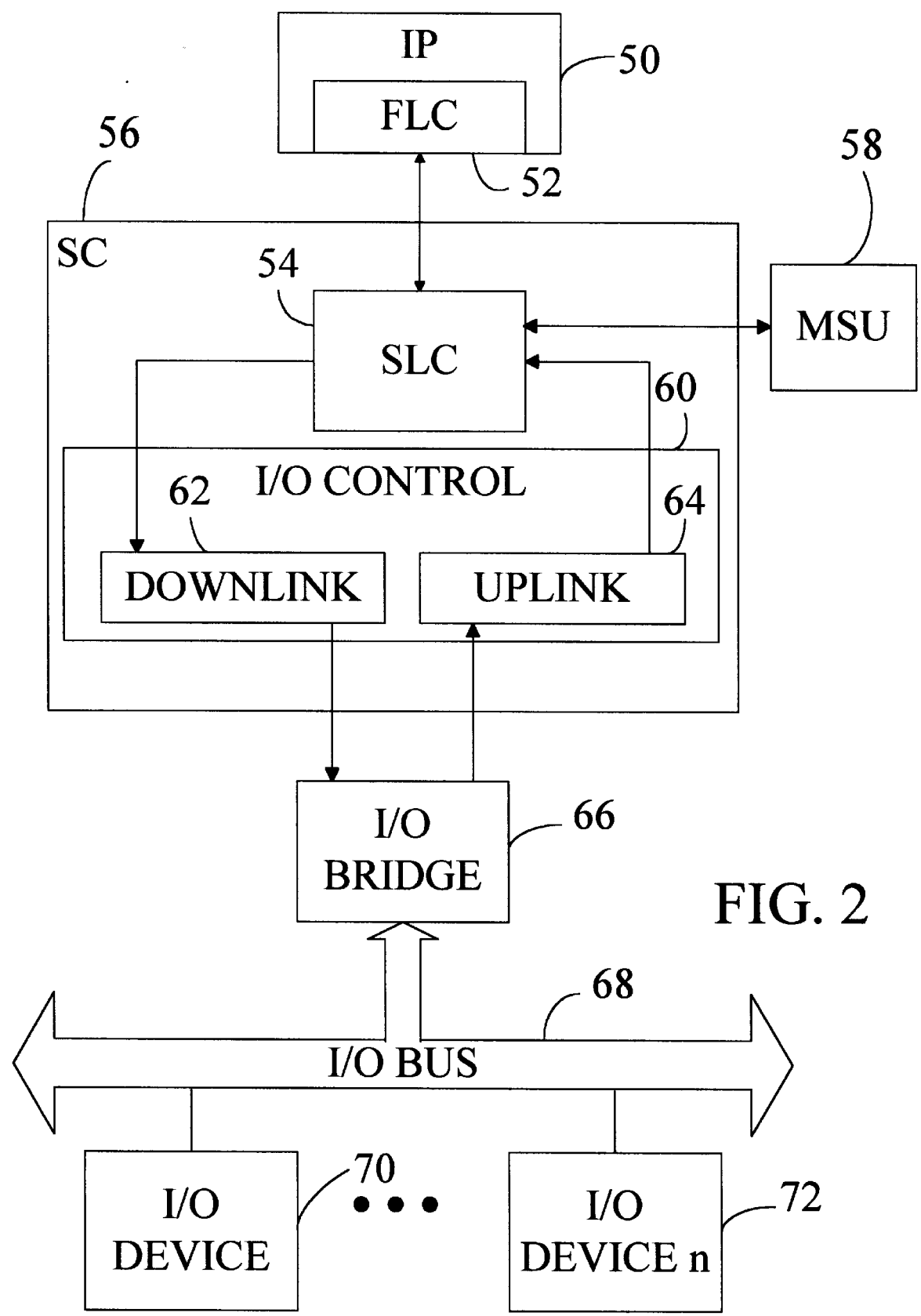
FIG. 2 is a block diagram of a portion of data processing system.

Referring now to FIG. 2, a more detailed block diagram of a portion of data processing system 10 is shown. Instruction processor (IP) 50 represents any of the instruction processors 12 through 14 as shown in FIG. 1. The instruction processor 50 includes a first level cache, labeled FLC 52. FLC 52 is a cache memory that is typically dedicated to a particular processor, and is used to provide fast memory accesses for instructions and operands associated with that particular processor. Coupled to the FLC 52 is the second level cache (SLC) 54 that resides in the storage controller (SC) 56. Operands and instructions that are not stored in the FLC 52 may be stored in the SLC 54 as a second level in the memory hierarchy. The second level cache 54 is a cache memory that can be shared between multiple processors in the multi-processor data processing system. Therefore, data stored in the second level cache 54 can be accessed by multiple instruction processors, where instructions and operands residing in a first level cache 52 are accessible only by its associated instruction processor 50. Failed attempts to access the FLC 52 and the SLC 54 result in data accesses to the main storage unit (MSU) 58, which is representative of any of the main storage units 22 through 24 in the data processing system 10 of FIG. 1. Within the SC 56 is the I/O control 60, which interfaces the SC 56 with an external I/O subsystem. The I/O control 60 includes the downlink module 62, and the uplink module 64. The uplink module 64 provides an asynchronous interface for read and write requests, and temporarily holds data packets while waiting for current memory transactions to be completed. Similarly, the downlink module 62 provides an asynchronous interface for returning read data between the I/O control 60 and the external I/O devices. The downlink module 62 and the uplink module 64 interface to the I/O devices through an I/O bridge 66, which is in turn coupled to the I/O bus 68. A plurality of I/O devices, labeled I/O device 70 through I/O device n 72, are coupled to the I/O bus 68. The I/O devices can initiate memory read and write commands from the I/O bus 68, to the I/O bridge 66, to the I/O control 60, and ultimately to the SLC 54.

Some I/O devices, such as I/O devices 70 through 72, execute a large number of memory read and write commands. Furthermore, a large number of I/O devices may be present in the system, further increasing the number of memory read and write commands to the SLC 54. Memory write commands require that at least some data be sent along with the command, and typically a block of data words are sent with the command. Where read and write commands are queued together in the uplink module 64, memory read or memory write through-put of the system can sometimes be unacceptably slow. For example, where multiple write commands are queued in the uplink module 64, a subsequent read command would be delayed until the preceding write commands have completed their memory cycles. The present invention allows I/O read and write command through-put to increase.

Figure 3:
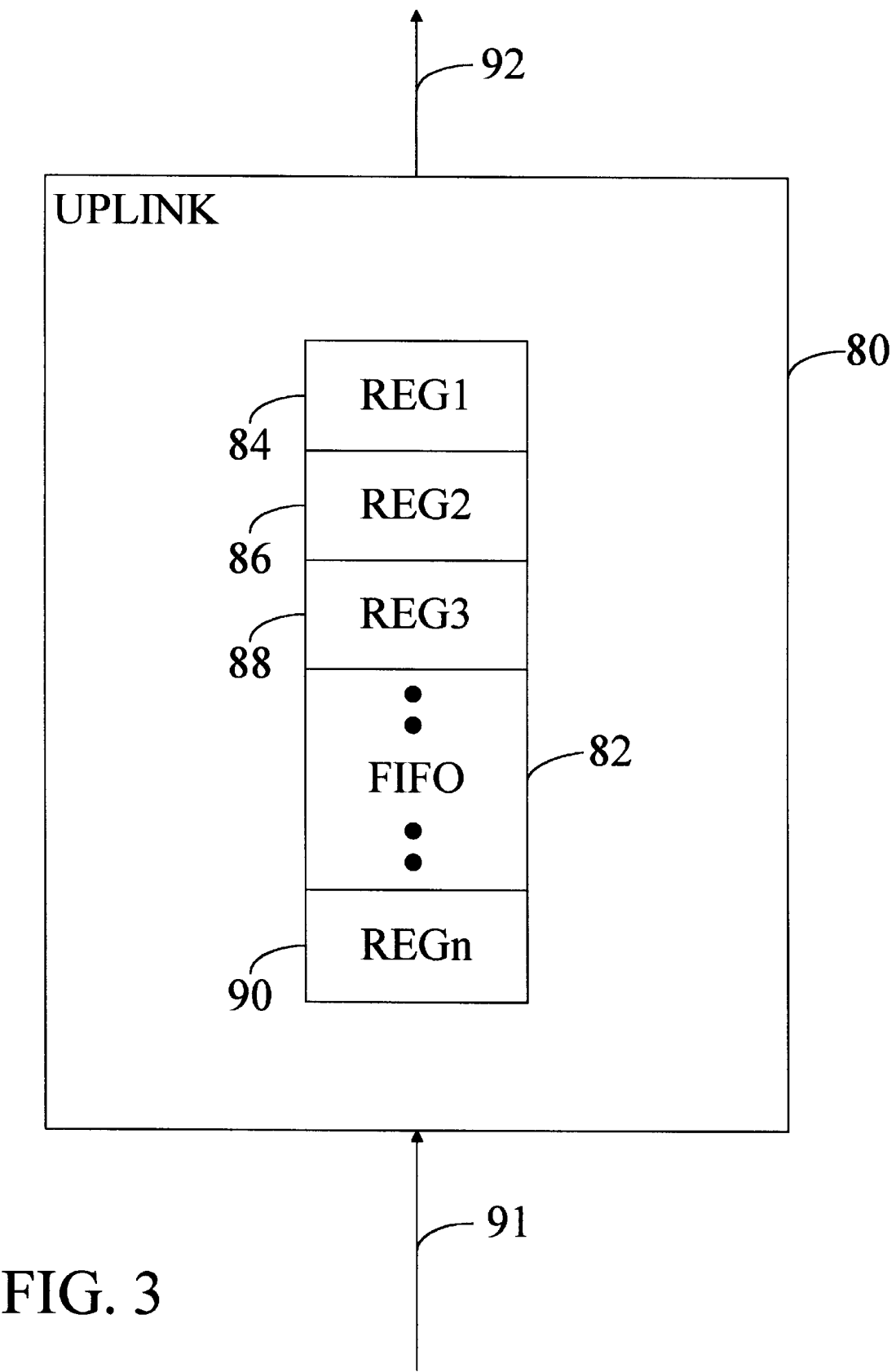
FIG. 3 is a block diagram of a prior art uplink module.

FIG. 3 is a block diagram of a prior art uplink module 80. As described in connection with FIG. 2, the uplink module 80 of the prior art includes a first-in-first-out (FIFO) 82, which is comprised of a plurality of data registers labeled REG1 84, REG2 86, REG3 88, through REGn 90. Read and write requests, and any associated data, enter the FIFO 82 as represented by arrow 91, and are transmitted by the uplink module 80 to the SLC 54 as represented by arrow 92 in a first-in-first-out fashion. Therefore, read data commands and write data commands are both queued together in FIFO 82, and executed in the order in which they were entered into the FIFO 82.

Figure 4:
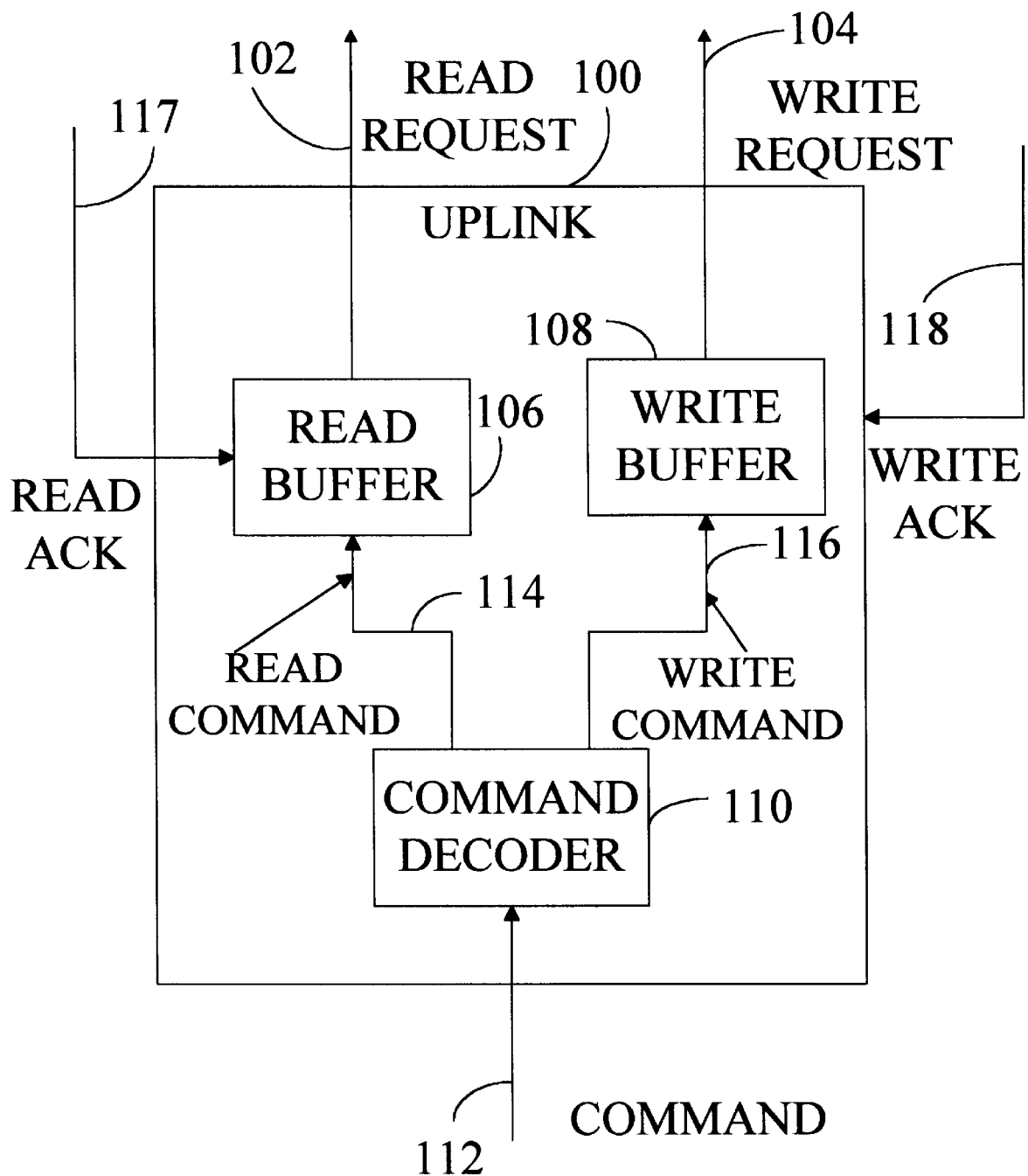
FIG. 4 is a block diagram of the uplink module.

FIG. 4 is a block diagram of one embodiment of the uplink module 100. While the signal on arrow 92 of FIG. 3 provides both read commands and write commands to the SLC 54, the uplink module 100 in FIG. 4 provides separate signal paths for the read commands and write commands, as can be seen from the read request line 102 and the write request line 104. Lines 102 and 104 provide separate paths for the read commands and write commands to reach the SLC 54. Separate memory buffers store the read commands and write commands in order to avoid additional delays. Read buffer 106 is a first-in-first-out (FIFO) memory buffer for queuing all of the read commands separately from the write commands. Similarly, write buffer 108 is an FIFO memory buffer for storing the write commands separately from the read commands. By separating the read commands from the write commands, read commands do not have to wait until the completion of preceding write commands. This requires the SLC 54 to be able to handle a read request in parallel with a write request.

Also in the uplink module 100 is a command decoder 110 that routes the incoming command on line 112 to the appropriate memory buffer in the uplink module 100. The command decoder 110 determines whether the command is a read command or a write command, and routes read commands on line 114 to the read buffer 106, and write commands on line 116 to the write buffer 108.

As the read and write buffers 106 and 108 independently store read and write commands, read and write requests are successively sent from lines 102 and 104 upon the completion of currently-executing read and write cycles. For example, another read request will be issued on line 102 to the SLC 54 upon completion of the current read memory cycle. The read buffer 106 will be informed of the completion of the current read memory cycle when it receives a read acknowledge signal on line 117. Similarly, the write buffer 108 will be informed of the completion of the current write memory cycle when it receives a write acknowledge signal on line 118. The acknowledge signals can be generated by external circuitry, or by the SLC 54. The generation of acknowledge signals is known in the art.

Figure 5:
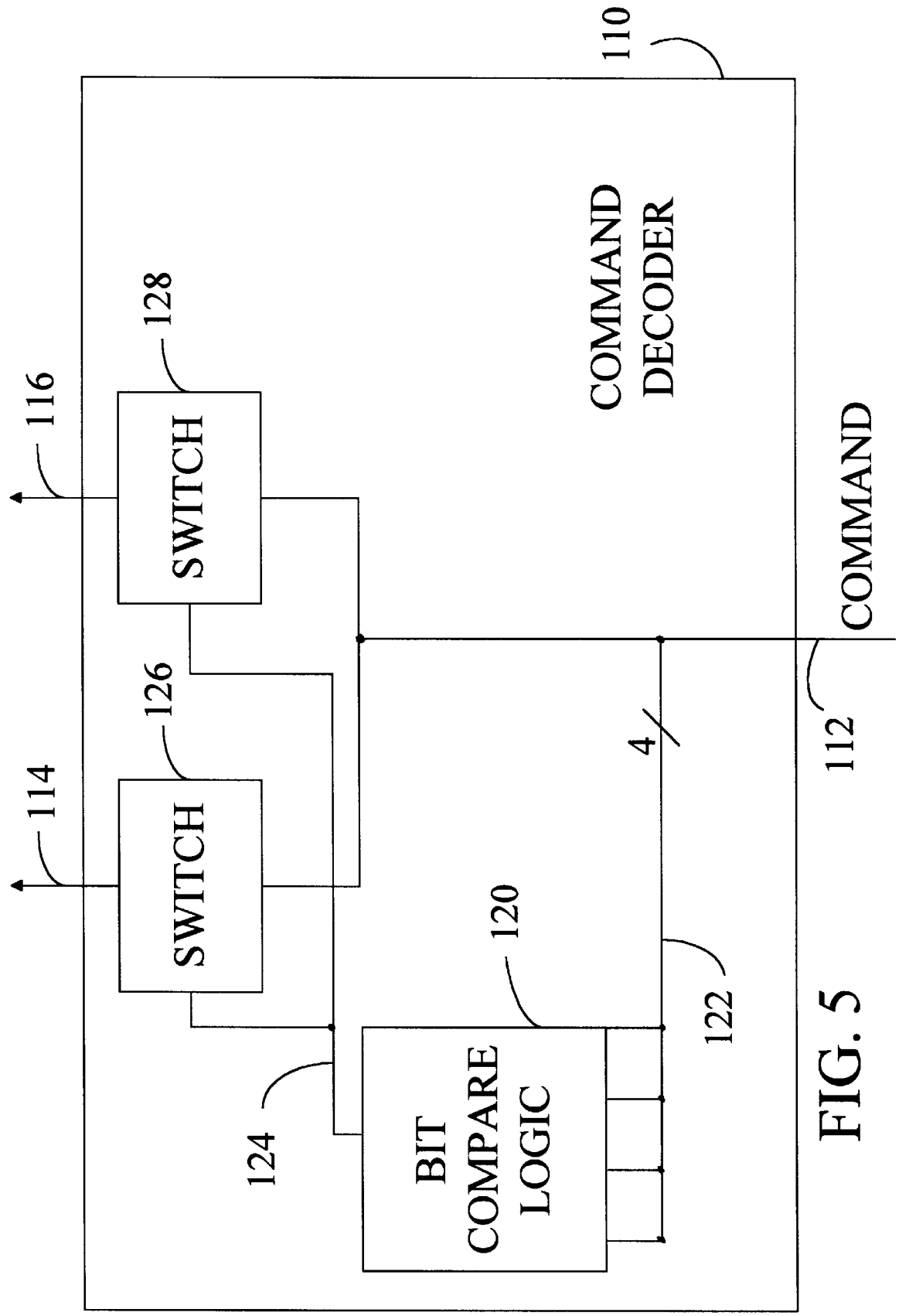
FIG. 5 is a block diagram of the command decoder.

FIG. 5 is a block diagram of one embodiment of the command decoder 110. The command enters the command decoder 110 on line 112. The command of the preferred embodiment is a multiple-bit binary word having various fields, one of which is a command field. The command field in the preferred embodiment is four bits wide, and these four command bits are routed to the bit compare logic 120 via the four-bit bus 122. The bit compare logic 120 compares the incoming command bits on bus 122 to known bit values to determine whether the command on bus 112 is a read command or a write command. Where the bit compare logic 120 determines that the command on bus 112 is a read command, the bit compare logic 120 outputs a signal on line 124 that enables switch 126 to pass the command on line 112 to the output of switch 126 on line 114. This command on line 114 is therefore the read command, which becomes the input into the read buffer 106 as shown in FIG. 4. Where the bit compare logic 120 determines that the command on bus 112 is a write command, the bit compare logic 120 outputs a signal on line 124 that enables switch 128 to pass the command on line 112 to the output of switch 128 on line 116. This command on line 116 is the write command, which becomes the input into the write buffer 108.

Figure 6:
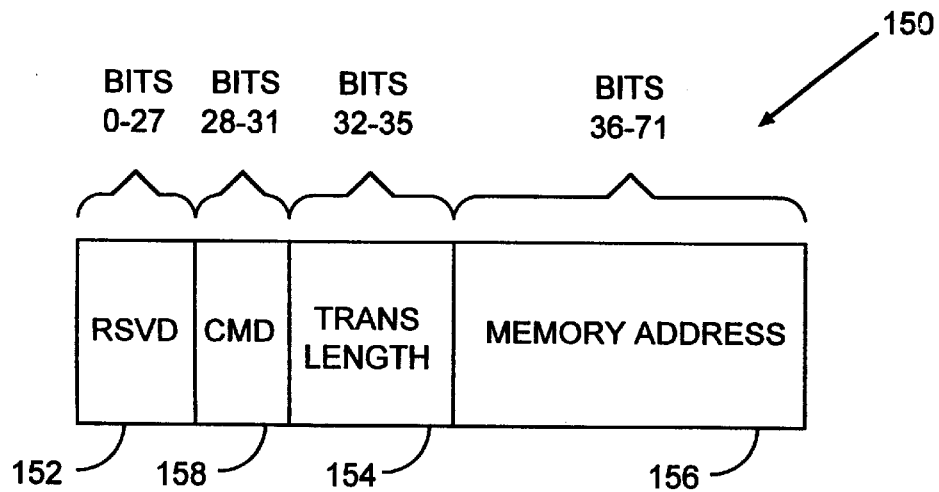
FIG. 6 illustrates a typical two-word command structure as implemented in the preferred embodiment of the invention.

FIG. 6 illustrates a typical two-word command structure 150 as implemented in the present invention. Bits 0 through 27 represent reserved field 152, bits 32–35 represent the transaction length field 154 of the command packet, and bits 36–71 represent the memory address field 156. Bits 28–31 represent the command field 158 which, in the preferred embodiment, is the four-bit command field. As previously described, the four-bit command field indicates what type of command is entering the uplink module 100 and the command decoder 110 on line 112. It should be recognized that any number of bits could be used in the command field, depending on the number of commands desired. The commands used in the system of the preferred embodiment include message commands and various read and write commands, such as memory block read, memory block write, and memory single word write. Any of the commands that involve a memory read or memory write will ultimately generate a read request signal or write request signal on lines 114 or 116 respectively (see FIGS. 4 and 5), as a result of the output of the bit compare logic 120 on line 124 of FIG. 5. Bits 28 through 31 of the command field 158 therefore represent the four-bit bus 122 as shown in FIG. 5.

Figure 7:
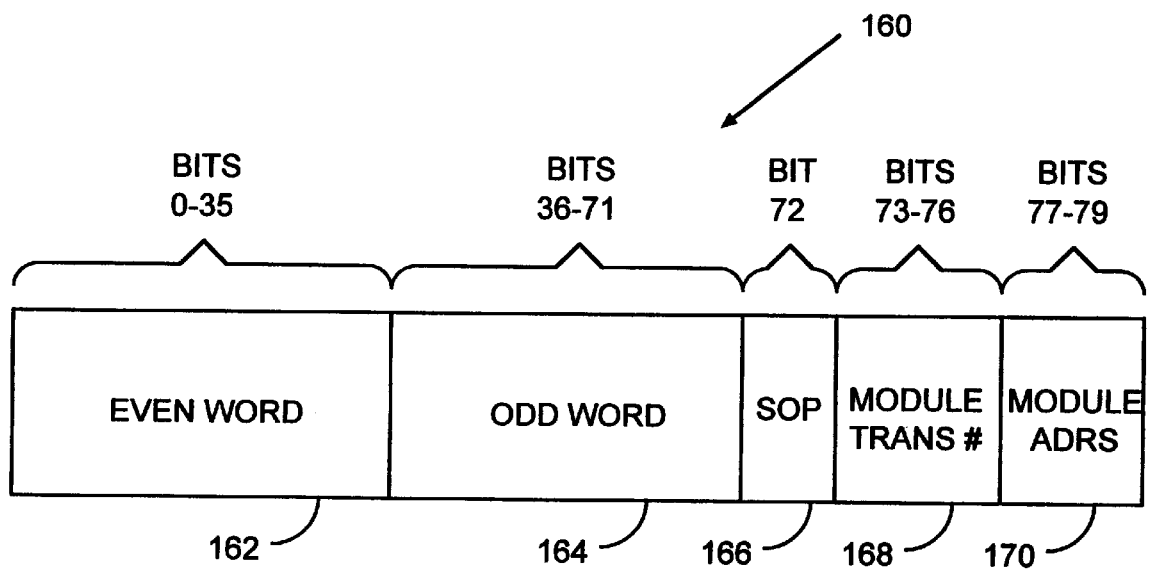
FIG. 7 illustrates a typical data structure for the transfer of commands and data to be written to the second level cache memory.

FIG. 7 illustrates a typical data structure 160 for the transfer of commands and data to be written to the SLC 54. The even word field 162 is comprised of bits 0 through 35, while bits 36 through 71 represent the odd word field 164. Bit 72, which is the start of packet flag field 166, indicates whether a data packet is beginning, or continuing. Bits 73 through 76 represent the module transaction number field 168, and bits 77 through 79 represent the module address field 170.

Figure 8:
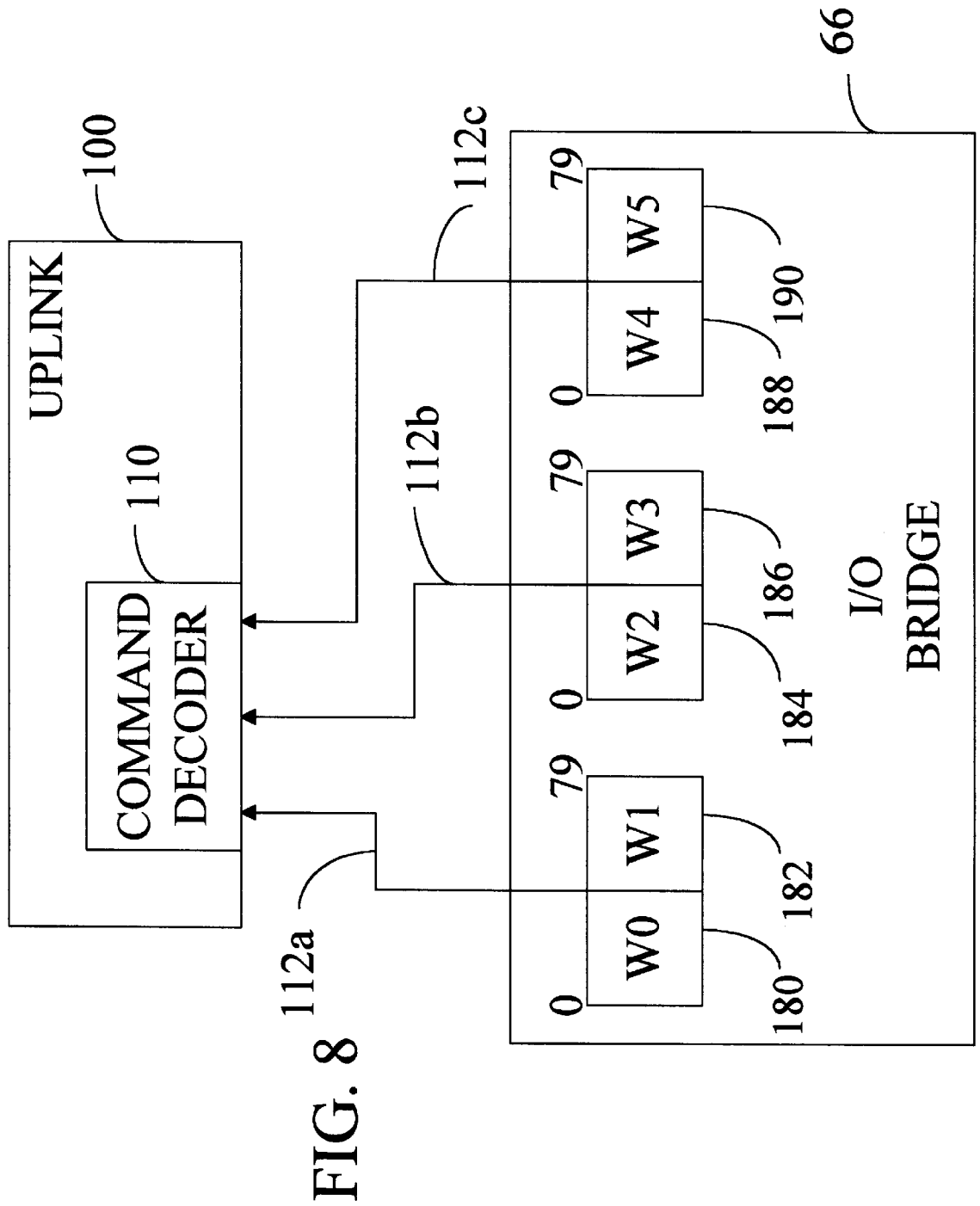
FIG. 8 is a block diagram of the interface between the I/O bridge and the uplink module.

FIG. 8 is a block diagram of the interface between the I/O bridge 66 and the uplink module 100. The I/O bridge 66 of the preferred embodiment includes six words of transfer registers labeled register W0 180, W1 182, W2 184, W3 186, W4 188, and W5 190. Bits 0 through 79 of the first data block 160 are transferred from words W0 180 and W1 182. Similarly, additional read commands having bits 0 through 79 can be transmitted from registers W2 through W5, or can contain write data associated with a write command in word W0 and W1. These registers transmit the commands and associated data to the command decoder 110 of the uplink module 100 via lines 112a, 112b, and 112c, which are represented together as line 112 in FIGS. 4 and 5. Because of the transaction link field 152 as shown in FIG. 6, the command decoder will know which words will contain the command field 156 to be decoded, and which words will contain data which do not require command decoding. This allows the command decoder to route the appropriate bits on bus 122 to the bit compare logic 120 as shown in FIG. 5.

Figure 9:
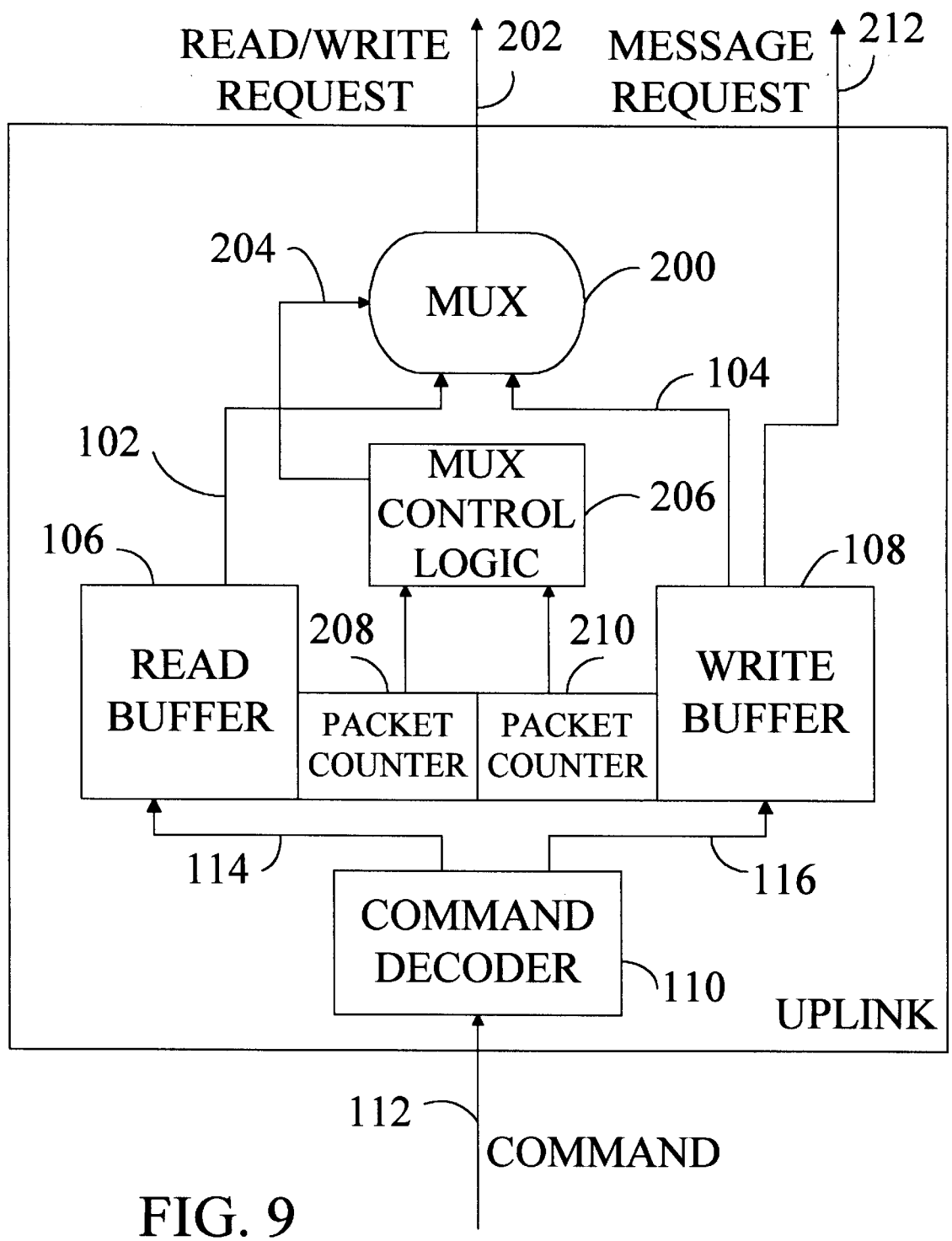
FIG. 9 is a block diagram of the preferred embodiment of the uplink module.

Referring now to FIG. 9, a block diagram of a preferred embodiment of the uplink module 100 is shown. The uplink module 100 of FIG. 9 includes a multiplexer labeled MUX 200. MUX 200 receives the read request and write request signals from lines 102 and 104 respectively, and outputs a read/write request on line 202. The read/write request signal on line 202 represents either the read request from line 102, or the write request from line 104, depending on the state of a control signal on line 204.

The control signal on line 204 is generated by the mux control logic 206, which receives inputs from the packet counters 208 and 210. In the preferred embodiment, the mux control logic 206 controls the mux 200 by way of a priority scheme. Various priority schemes can be used to provide balanced or unbalanced fixed priorities, round-robin priorities, and so forth. In the preferred embodiment, the priority scheme selected was an alternating priority scheme which balances the number of read and write requests being sent from the uplink module 100. The packet counters 208 and 210 are used to monitor when a packet has been sent from the read buffer 106 or the write buffer 108 respectively, so that the other buffer is then granted priority for providing the next memory request on line 202. For example, the packet counter 208 will determine that a read request has been issued from the read buffer to the mux 200 via line 102, so that the mux control logic will switch to allow the input from the write buffer 108 to be passed next through the mux 200.

The use of the MUX 200 allows one interface to be used instead of two to the SLC 54. In other words, the SLC 54 needs only one set of input pins to receive read and write requests from the uplink module 100. The SLC 54 can receive a read request on line 202 when the control signal on 204 routes the read request on line 102 to line 202, and while the SLC 54 is completing this read request, the write request signal on line 104 can be transferred through the MUX 200 to line 202 to initiate a data write to the SLC 54.

In another embodiment of the invention, the buffers 106 and 108 can also queue different types of information. For example, message packets can be queued along with write requests in the write buffer 108. Generally, message packets are packets of information that are communicated between units, such as between I/O units, between an I/O unit and a processing unit, or between processing units. These message packets therefore do not comprise storage data destined for the SLC 54, but rather bypass the SLC 54 and proceed directly to the target unit, as illustrated by the message request signal on line 212. It may be desirable to include such memory requests in a common queue, in order to ensure a particular sequence of events. For example, a data write may be required before a message can be sent to another unit, as the data write may be a prerequisite for the message to be correct, or even to occur at all. By queuing the messages behind such write requests, the desired sequence can be maintained.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. An input/output (I/O) interface architecture for use in a data processing system, the data processing system including an I/O bus and a memory, the interface architecture comprising:
   (a) an I/O bridge, coupled to the I/O bus, having bridge outputs to output commands received from the I/O bus;
   (b) an uplink module, coupled to receive the commands from the I/O bridge, the uplink module comprising:
      (i) a read buffer having a first plurality of data registers to store read request commands, and having a read buffer output terminal to output the read request commands to the memory;
      (ii) a write buffer having a second plurality of data registers to store write request commands, and having a write buffer output terminal to output the write request commands to the memory; and
      (iii) command decode means, coupled to the I/O bridge, for receiving the commands and decoding command identification bits to distinguish the read request commands from the write request commands, and for routing the read request commands to the read buffer and the write request commands to the write buffer.

2. The interface architecture as in claim 1, wherein the read buffer comprises a first-in-first-out (FIFO) read queue.

3. The interface architecture as in claim 2, wherein the read buffer output terminal comprises read request enable means for outputting a successive one of the read request commands in the FIFO read queue upon receipt of a read acknowledge signal.

4. The interface architecture as in claim 1, wherein the write buffer comprises a first-in-first-out (FIFO) write queue.

5. The interface architecture as in claim 4, wherein the write buffer output terminal comprises write request enable means for outputting a successive one of the write request commands in the FIFO write queue upon receipt of a write acknowledge signal.

6. The interface architecture as in claim 1, wherein:
   (a) the read buffer output terminal comprises read request enable means for outputting a successive one of the read request commands in the FIFO read queue upon receipt of a read acknowledge signal;
   (b) the write buffer output terminal comprises write request enable means for outputting a successive one of the write request commands in the FIFO write queue upon receipt of a write acknowledge signal; and
   (c) the read request enable means and the write enable means operate independently of each other.

7. The interface architecture as in claim 1, wherein the command decode means comprises bit compare means for comparing the command identification bits to predetermined bit patterns to distinguish the read request commands from the write request commands.

8. The interface architecture as in claim 7, wherein the bit compare means comprises a comparator for each of the command identification bits.

9. The interface architecture as in claim 7, wherein the bit compare means comprises software compare means for comparing the command identification bits to the predetermined bit patterns by way of program code.

10. The interface architecture as in claim 7, wherein the command decode means further comprises switching means coupled to the bit compare means, for enabling the read request commands to be routed to the read buffer when the bit compare means determines that the command is a read request command, and for enabling the write request commands to be routed to the write buffer when the bit compare means determines that the command is a write request command.

11. The interface architecture as in claim 1, further comprising multiplexing means, coupled to the read and write buffers to receive the read and write request commands respectively, for outputting either the read or write request command to the memory in response to a control signal.

12. The interface architecture as in claim 1, wherein the command decode means comprises means for receiving the command identification bits in parallel from a command field within the commands.

13. A method for transmitting commands from one or more input/output devices to a memory, the method comprising the steps of:
   (a) appending an identification tag to each command to define the command to be a read command to read data from the memory, or to define the command to be a write command to write data to the memory;
   (b) separating the read commands from the write commands based on the identification tag;
   (c) queuing the read commands in a first command queue and the write commands in a second command queue; and
   (d) transferring a successive read command to the memory upon completion of a current memory read function, and transferring a successive write command to the memory upon completion of a current memory write function, wherein the transfer of read and write commands is independent of each other.

14. The method as in claim 13, wherein the step of appending an identification tag comprises the step of including a command identification bit field into each command issued from the one or more input/output devices.

15. The method as in claim 13, wherein:
   (i) the step of queuing the read commands in a first command queue comprises the step of entering the read commands into a first-in-first-out (FIFO) memory buffer; and
   (ii) the step of queuing the write commands in a second command queue comprises the step of entering the write commands into a different first-in-first-out (FIFO) memory buffer.

16. The method as in claim 13, wherein the step of separating the read commands from the write commands comprises the step of comparing the identification tag to predetermined identification tags to distinguish the read commands from the write commands.

17. The method of claim 16, wherein the step of comparing the identification tag to predetermined identification tags comprises the step of comparing at least one bit of the identification tag to a like number of predetermined bit values.

18. The method of claim 16, further comprising the steps of:
   (i) providing the read commands on a first signal line when the identification tag matches a first predetermined identification tag; and
   (ii) providing the write commands on a second signal line when the identification tag matches a second predetermined identification tag.

19. The method of claim 18, further comprising the steps of:
   (i) providing the read and write commands from the first and second signal lines to the memory on common inputs of the memory; and
   (ii) switching between the first and second signal lines to provide only one of the read and write commands to the common inputs at a time.

20. The method of claim 13, wherein:
   (i) the step of transferring a successive read command comprises the step of generating a read acknowledge signal to indicate the completion of the current memory read function; and
   (ii) the step of transferring a successive write command comprises the step of generating a write acknowledge signal to indicate the completion of the current memory write function.

* * * * *